United States Patent
Markham

(10) Patent No.: US 7,096,826 B2
(45) Date of Patent: Aug. 29, 2006

(54) PET TOYS INCORPORATING MULTIPLE HARDNESS SECTIONS

(76) Inventor: Joseph P. Markham, 12094 W. 75th Pl., Arvada, CO (US) 80005

( * ) Notice: Subject to any disclaimer, the term of this patent is extended or adjusted under 35 U.S.C. 154(b) by 112 days.

(21) Appl. No.: 11/007,892

(22) Filed: Dec. 8, 2004

(65) Prior Publication Data

US 2005/0092258 A1 May 5, 2005

Related U.S. Application Data

(63) Continuation-in-part of application No. 10/288,960, filed on Nov. 5, 2002.

(51) Int. Cl.
*A01K 29/00* (2006.01)
*A63H 27/00* (2006.01)
(52) U.S. Cl. .......................... 119/707; 446/46
(58) Field of Classification Search ............... 119/707, 119/709, 711; D30/160; 446/34, 48; D21/436, D21/437, 441, 443
See application file for complete search history.

(56) References Cited

U.S. PATENT DOCUMENTS

| | | | |
|---|---|---|---|
| 510,290 A | 12/1893 | Renear | |
| 4,173,839 A * | 11/1979 | Kovac | ............................ 446/46 |
| 4,253,672 A | 3/1981 | Milzoff et al. | |
| 4,279,097 A | 7/1981 | Walker | |
| D280,220 S | 8/1985 | Blight | |
| 4,802,875 A | 2/1989 | Cunningham | |
| 4,919,083 A | 4/1990 | Axelrod | |
| 4,940,441 A | 7/1990 | Novinsky | |
| 5,484,159 A | 1/1996 | Dean et al. | |
| 5,540,610 A * | 7/1996 | Sneddon | ........................ 446/46 |
| 5,630,742 A | 5/1997 | Honaker | |
| 6,073,588 A | 6/2000 | McClung, III et al. | |
| 6,174,214 B1 | 1/2001 | Cooper | |
| 6,202,598 B1 | 3/2001 | Willinger | |
| D441,506 S | 5/2001 | Cooper | |
| 6,228,001 B1 | 5/2001 | Johnson et al. | |
| 6,383,052 B1 | 5/2002 | McCarthy | |
| 6,443,861 B1 | 9/2002 | Foulke | |
| D465,815 S | 11/2002 | Roehl et al. | |
| 6,918,809 B1 * | 7/2005 | Persall | ........................ 446/46 |
| 2001/0047770 A1 * | 12/2001 | Pontes | ......................... 119/707 |
| 2002/0034918 A1 | 3/2002 | Komuro | |
| 2003/0096554 A1 | 5/2003 | Persall | |
| 2003/0226521 A1 | 12/2003 | Dobihal | |
| 2004/0259460 A1 | 12/2004 | Persall et al. | |
| 2005/0053756 A1 * | 3/2005 | Axelrod | ...................... 119/707 |

OTHER PUBLICATIONS

MatWeb Material Property Data; Shore (Durometer) Hardness Testing of Plastics.

* cited by examiner

*Primary Examiner*—Teri Pham Luu
*Assistant Examiner*—Elizabeth Shaw
(74) *Attorney, Agent, or Firm*—Sheridan Ross, P.C.

(57) ABSTRACT

A molded pet toy includes sections or layers of various hardnesses. The pet toy may be constructed through known injection molding, transfer, or compression molding processes. The layers and sections typically have varying hardnesses which facilitates use of the pet toy for a specific purpose. For use as a pet toy, an optimal arrangement provides that the outermost section or layer is of a lower hardness, while the inner sections or layers have a higher hardness. Durability of the pet toy is increased through the molding process which prevents separation between the layers. The pet toy is preferably shaped aerodynamically so it may be easily thrown by a user.

11 Claims, 6 Drawing Sheets

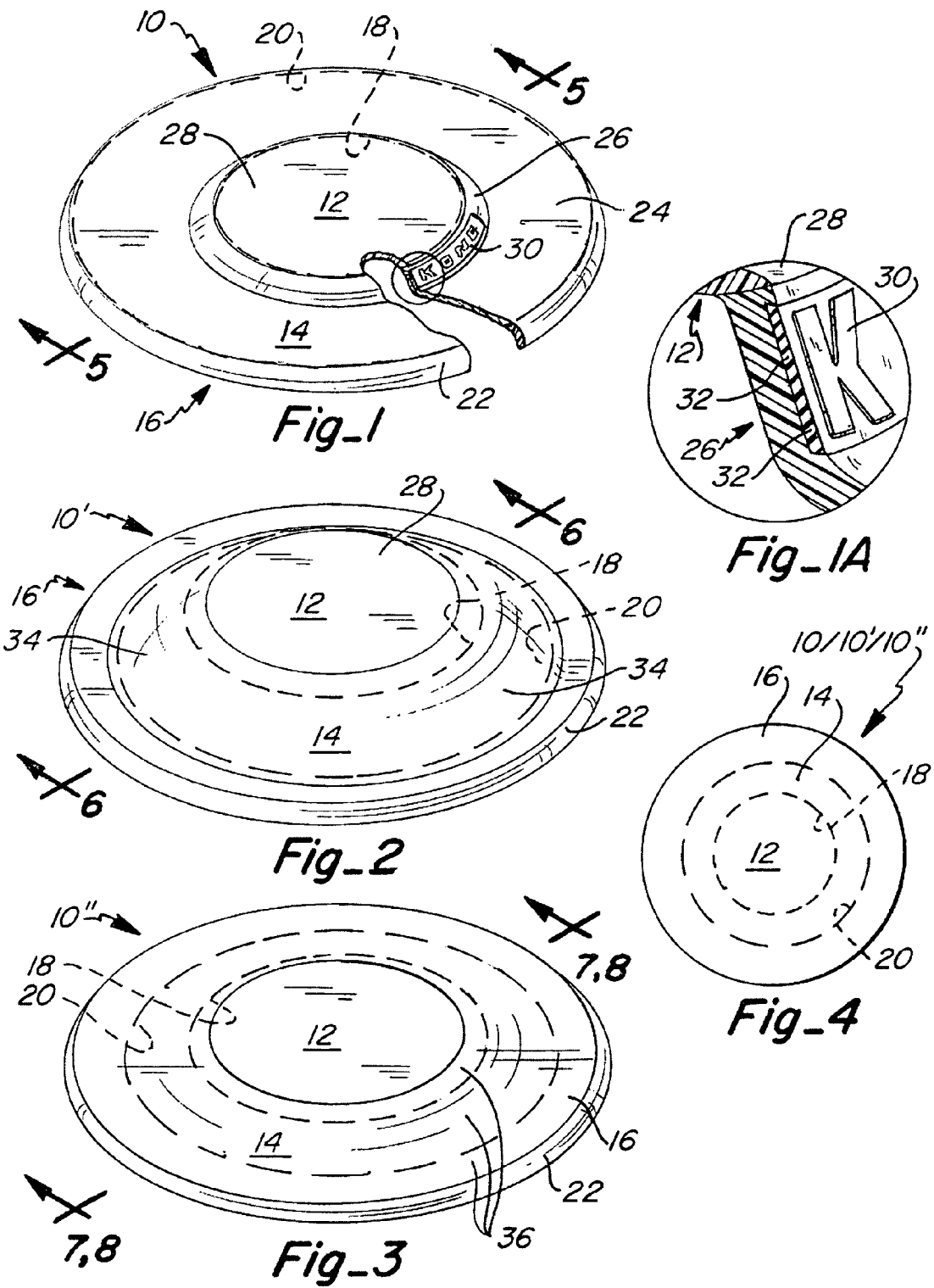

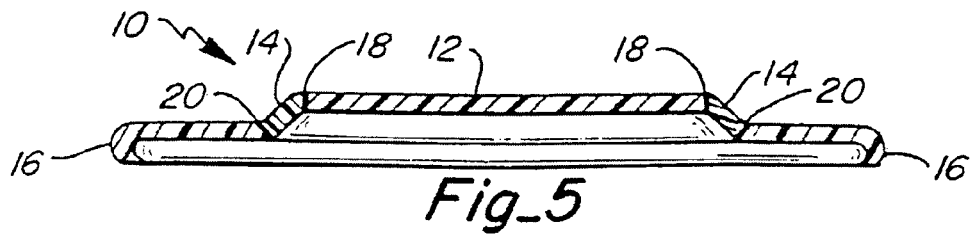
Fig_5
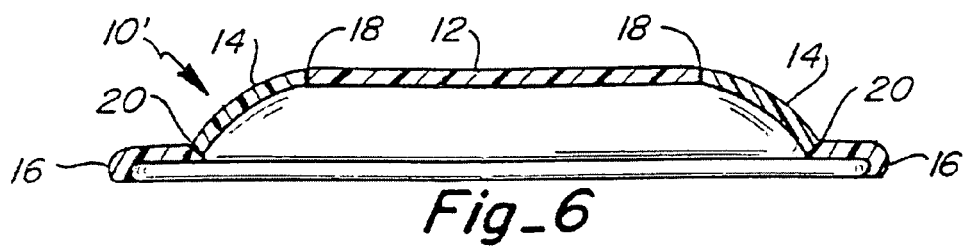
Fig_6
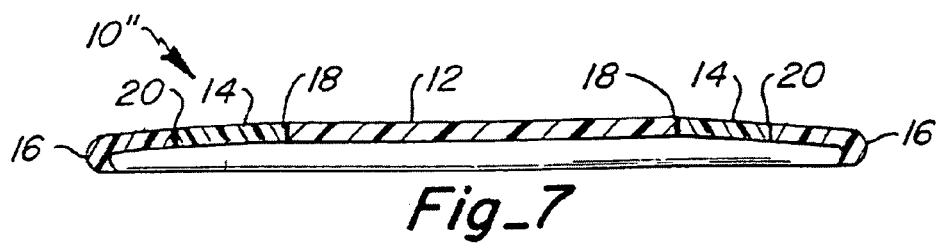
Fig_7
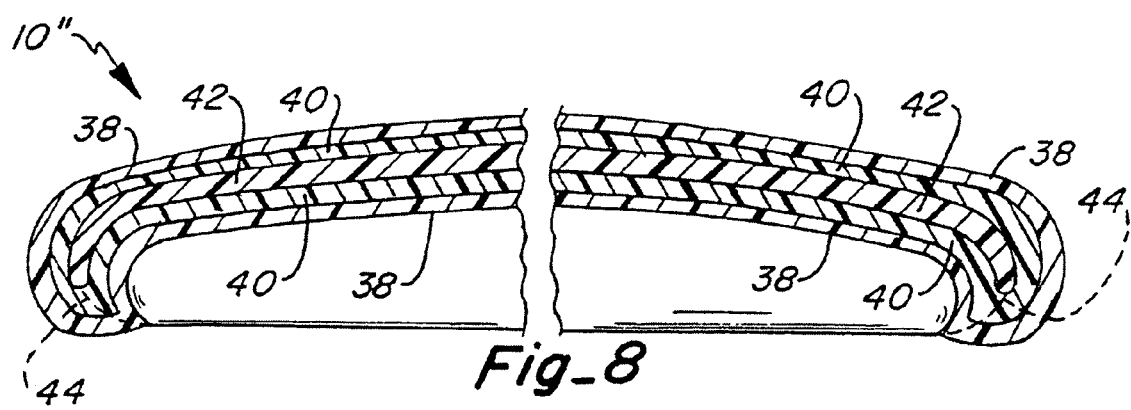
Fig_8

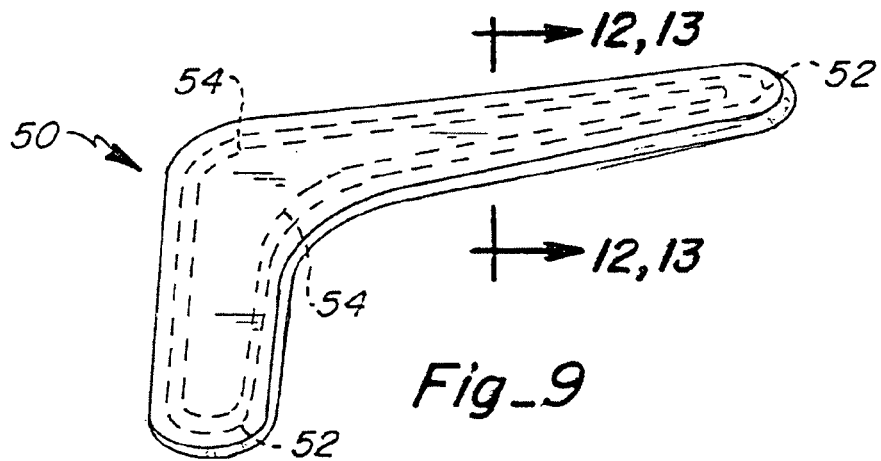
Fig_9
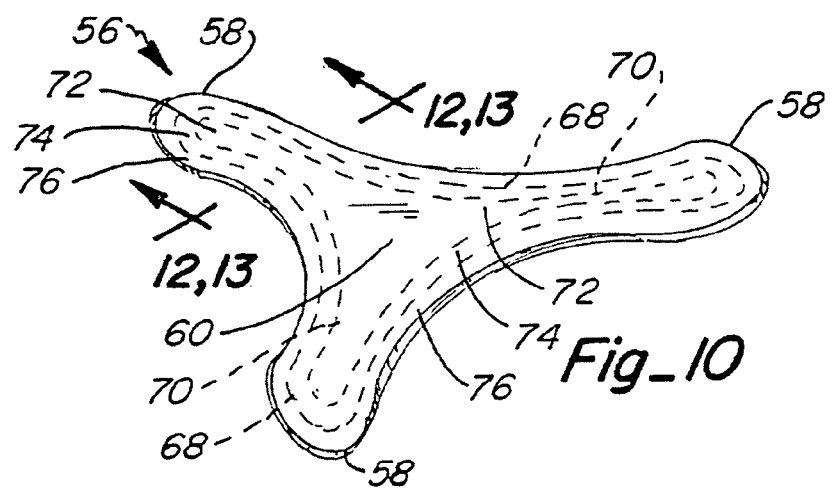
Fig_10
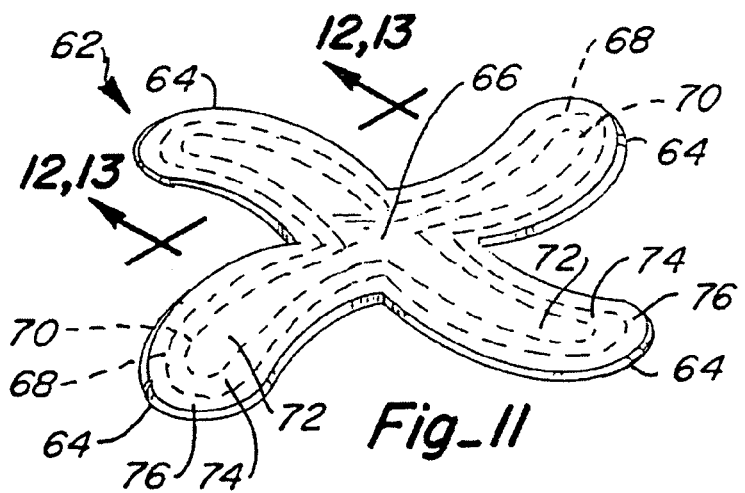
Fig_11

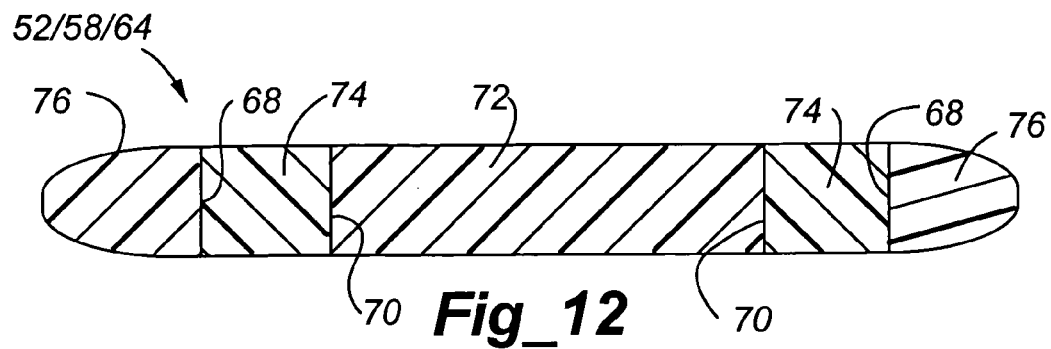
Fig_12
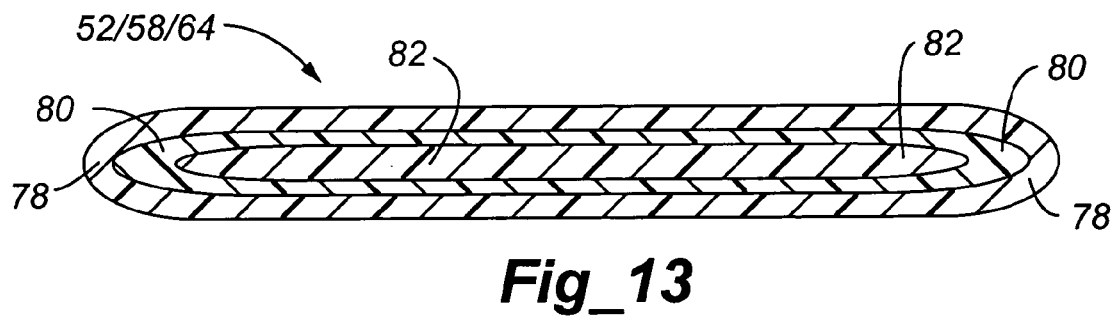
Fig_13
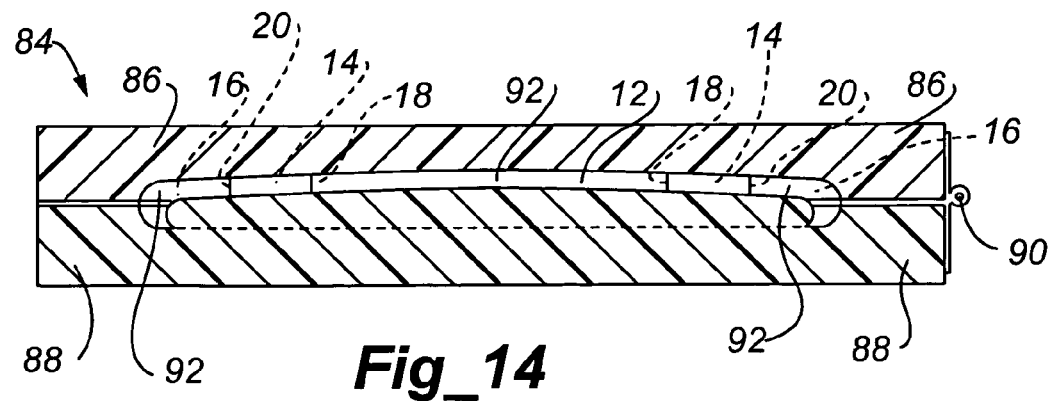
Fig_14

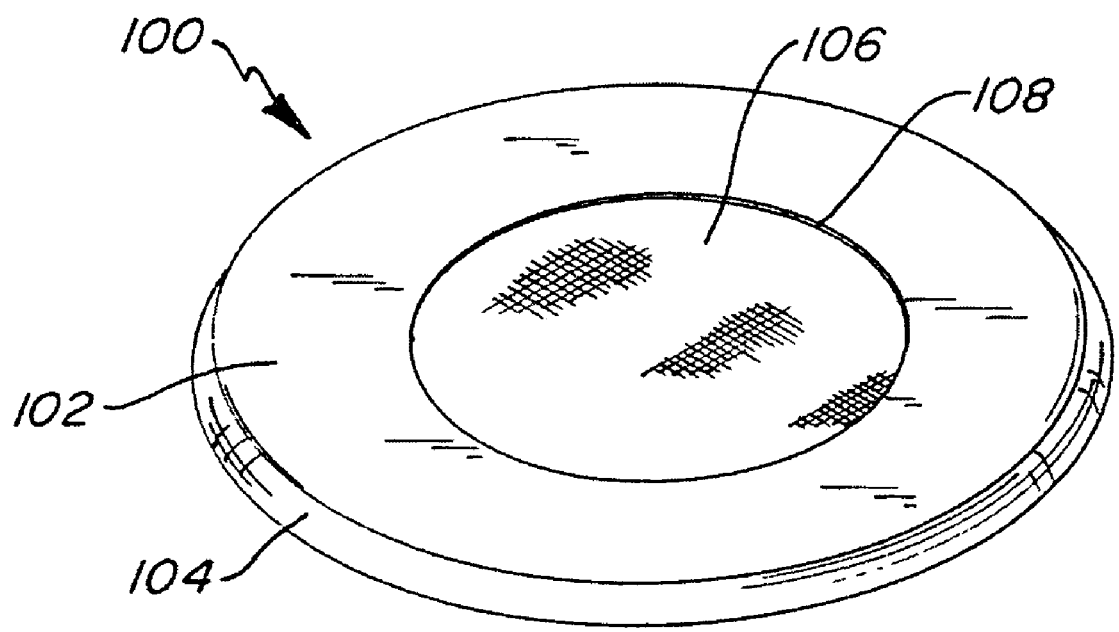
Fig_15

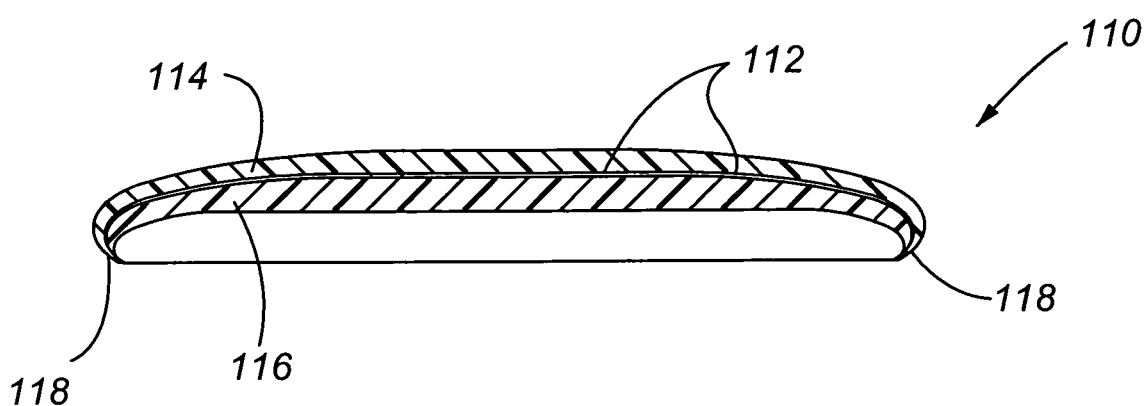
Fig_16

PET TOYS INCORPORATING MULTIPLE HARDNESS SECTIONS

CROSS REFERENCE TO RELATED APPLICATION

This application is a continuation-in-part application of copending application Ser. No. 10/288,960, filed on Nov. 5, 2002, the disclosure of which is incorporated herein by reference.

FIELD OF THE INVENTION

This invention relates to pet toys which incorporate multiple hardness sections in the construction of the pet toy, and more particularly, to pet toys having integrally molded sections in which the sections have differing hardnesses in order to accommodate specific purposes, such as preventing damage to an animal's mouth, as well as damage to surrounding objects which may be struck by the pet toy.

BACKGROUND ART

Many types of flying objects are available which are designed to be gripped on the outer edge or periphery with the hand, and then thrown through the air. These flying objects may be of varying shapes to include frisbee® type shapes and others. Because of the ability to control the flight patterns of flying disc-type toys, flying discs have become popular for use as pet toys for dogs. The popularity of use of flying discs for dogs has grown to the extent that national competitions are now conducted which allow owners to enter their dogs in competition against other dogs.

One distinct disadvantage with prior art disc-like toys which are either intended for human or animal use, is that if the toys are used for animals, the toys are typically made of a plastic material which can be easily punctured by the dog's teeth. Subsequently, the pet toy then develops rough or jagged edges due to the puncturing by the animal's teeth. These rough edges can damage the animal's mouth. Over time, continued use of a damaged pet toy can result in ingestion by the animal which can be harmful and sometimes fatal to the animal.

Another disadvantage of disc-like pet toys or human toys is that they are typically of a hardness which makes them unsuitable for use indoors. These toys are typically hard enough to break a window or other glass objects. Therefore, these pet toys have to be used with care both indoors and outdoors to prevent damage to a home or other structures.

One example of a prior art flying disc-like object includes the one disclosed in U.S. Pat. No. 5,484,159. This reference discloses a substantially flat, rigid flying object having a layer of resilient material which covers the upper surface and lower surface. The resilient material has a greater resiliency than the inner core to provide a cushioned grip.

Another reference disclosing a flying disc-like object includes U.S. Pat. No. 4,253,672. This reference specifically discloses an arial projectile having a circular core of pliant sheet material, such as foam rubber. The circular core is internally stressed by a plurality of stitches which are machine sewn along a marginal circumference urging the core into a saucer-like configuration. The stitching also attaches a fabric covering to the core.

U.S. Pat. No. 4,940,441 discloses an aerodynamic disc comprising a central portion and a perimeter portion, the central portion having a rotatably removable insert. The central portion is made of a different material than the perimeter portion.

U.S. Pat. No. 4,919,083 discloses a pet toy in the shape of a disc, and a bone shaped structure residing on the upper surface thereof. Alternatively, the upper surface may have a circular crown-shaped portion.

U.S. Pat. No. 5,630,742 discloses a flexible toss device in a disc-shaped configuration having a flat top portion, and a relatively short side portion with an outer bead portion. The body is made of a soft elastomer material with relatively thin, tear-resistant walls. The top portion and side portion have sufficient rigidity so that the side portion flexes outwardly on spinning, during flight, causing the top portion to flex downwardly.

U.S. Pat. No. 5,540,610 discloses a flying disc toy having an upper surface or layer preferably made of a laminate foam layer and an inner cross-link polyethylene foam layer. The toy further comprises a lower body section preferably made of a polyurethane foam layer.

Although the prior art may be adequate for its intended purposes, a need still exists for a durable pet toy which may be made of differing hardnesses to prevent damage to an animal's mouth or damage to surrounding objects. Furthermore, a need still exists for a disc shaped pet toy which is durable and which maintains good flight characteristics, as well as being easily manufactured.

SUMMARY OF THE INVENTION

In accordance with the present invention, a pet toy is provided which incorporates multiple hardness sections. The pet toy may be disc shaped, resembling a frisbee® type toy. The pet toy is preferably constructed of the same material; however, different grades of the material are provided with various hardnesses, and these various hardnesses make up distinct sections of the pet toy. In a first configuration of the materials used in the pet toy, the pet toy may include two or more sections which are arranged concentrically so that an outer section has the lowest hardness, and the one or more inward lying sections have increasing hardnesses. More specifically, the first embodiment may be in the form of a disc-like object having an outer circumferential section of a first hardness, an intermediate section of a second harder hardness, and a third or center section of hardest construction. The outer section is also resilient or elastomeric so that it will accommodate the biting action of an animal without being punctured or torn. The outer section is also resilient enough so that damage is avoided if the pet toy strikes an object.

A second configuration or arrangement of the materials within the pet toy provide for a layered configuration wherein the outer-most surface of the pet toy would be made of a material having a first hardness, and one or more interior layers would be made of the same material, but having increasing hardnesses. According to this second configuration, the intent is also to provide a pet toy wherein the outer-most layer prevents damage to the animal's mouth, yet provides a cushioning effect if striking an object.

The most advantageous material for use in the present invention includes synthetic rubber, natural rubber, or combinations of synthetic and natural rubber. The pet toy can be molded in a molding manufacturing process which allows distinct boundaries to be formed between the different layers or sections of material having the various hardnesses. Also, because of construction through a molding process, the boundaries between the different hardness sections or layers are tightly bonded to one another, and separation or general failure along the boundaries is thereby greatly reduced. Particularly for use with large dogs, layers or sections which are merely bonded by adhesive can be separated by the biting action of the dogs. In addition to the materials mentioned above, another combination of materials which may be used in the present invention would include synthetic or natural rubber in one or more layers or sections of the toy, along with at least one layer or section of fabric-like material or canvass material. For example, in the first embodiment, the inner most or center section could be made of a durable fabric or canvass type material, while the outer section(s) could be made of rubber. Use of canvass or fabric would reduce the weight of the toy, yet still allow the toy to maintain its aerodynamic characteristic because the outer section (s) would maintain enough stiffness so that the toy could still be thrown by the user without undue deformation or bending. Use of a fabric or canvass section also allows additional opportunities for marking the pet toy, as well as placing aesthetic designs or colors on the canvass/fabric. In the layered configuration, it is also contemplated within the present invention that at least one of the layers of the pet toy could include a fabric/canvass. For most applications, use of a fabric or canvass layer would be used on the most outer surface or layer.

Also in accordance with the present invention, a method of manufacturing the pet toy is provided wherein the method comprises the steps of providing a mold of a desired shape, introducing a first material of a first hardness to a first interior portion of the mold, introducing a second material of a second lower hardness to a second exterior lying portion of the mold, and conducting a molding operation to mold the toy wherein the first and second materials are molded to one another along a boundary. The first and second materials may be introduced into the mold as by injection, or the first and second materials my be die cut sheets of material which are placed into the molds. In the layered configuration, it is preferential to use die cut sheets of material which are stacked on top of one another in the desired layered fashion. Known transfer and compression molding processes may also be used to manufacture the pet toy when using rubber type materials.

In addition to a disc-like shape, the toy of the present invention may also be incorporated within other shapes which have aerodynamic characteristics allowing them to fly. Such shapes would include a boomerang shape, a three-legged planar shape, or a four-legged planar shape. Each of these additional shapes can be molded either in the sectioned or layered configurations.

Other objects and features of the present invention will become apparent by reviewing the following detailed description taken with the accompanying drawings.

BRIEF DESCRIPTION OF THE DRAWINGS

FIG. 1 is a fragmentary perspective view of the pet toy of the present invention in a first embodiment;

FIG. 1a is a greatly enlarged fragmentary perspective view of the designated portion of FIG. 1;

FIG. 2 is a perspective view of a modification to the shape of the first embodiment;

FIG. 3 is a perspective view of another modified shape of the first embodiment;

FIG. 4 is a planar view of FIG. 1, 2, or 3 illustrating the distinct sections and boundaries which may be formed in the pet toy;

FIG. 5 is a vertical cross-section taken along line 5—5 of FIG. 1;

FIG. 6 is a vertical cross-section taken along line 6—6 of FIG. 2;

FIG. 7 is a vertical cross-section taken along line 7—7 of FIG. 3;

FIG. 8 is a greatly enlarged fragmentary vertical cross-section taken along line 8—8 of FIG. 3 illustrating a layered configuration;

FIG. 9 is a perspective view of a second embodiment of the present invention;

FIG. 10 is a perspective view of a third embodiment of the present invention;

FIG. 11 is a perspective view of a fourth embodiment of the present invention;

FIG. 12 is a vertical cross-section taken along lines 12—12 of FIG. 9, 10 or 11;

FIG. 13 is a vertical cross-section taken along lines 13—13 of FIG. 9, 10 or 11 illustrating the pet toy in a layered configuration;

FIG. 14 is a simplified vertical cross-section of a clam-shell type mold illustrating a cavity therein which is formed in the shape of the pet toy of FIG. 3 and further illustrating the specific areas in the molds which correspond to the sections of material when the material is either injected into the mold, or die cut sections are placed within the mold;

FIG. 15 is a perspective view of yet another embodiment of the present invention; and FIG. 16 is a vertical cross-section illustrating another example of the pet toy in the layered configuration.

DETAILED DESCRIPTION

Referring to FIG. 1, the first embodiment of the present invention is illustrated. In general terms, the pet toy is configured in a disc-like shape, thereby allowing it to be thrown like a frisbee®. The pet toy 10 is shown as including three distinct circumferentially arranged areas or sections, namely, center section 12, intermediate section 14, and outer section 16. Each of these sections may be made up of material of different hardnesses. For example, the outer section 16 may be made of a rubber having a first hardness, the intermediate section 14 may be made of a rubber having a second harder hardness, and the center section 12 may be made of a rubber having a third hardest hardness. The center section 12 and intermediate section 14 are joined along a boundary 18, while the outer section 16 and intermediate section 14 are joined along boundary 20. The specific shape of the pet toy shown in FIG. 1 may be characterized as including a lower circumferential flat 24, an inclined circumferential rise 26, and an upper flat 28. A lip 22 may be formed around the periphery of the toy.

In order to facilitate marking of the pet toy either with the manufacturer's name, or other product identifying features, an integrally molded tag or label 30 may be used. The tag 30 may also be constructed of the same material as one of the sections, whereby molding of the tag or label allows it to be more permanently affixed to the pet toy. As shown in FIG. 1a, the label 30 may be a thin flat piece of material having a lower surface or edge 32 which is molded to the exterior surface of the rise 26.

FIG. 2 illustrates a slight modification to the shape of the pet toy shown in FIG. 1, as well as a modification to the spacing and size of the sections. More specifically, FIG. 2 presents a disc-like pet toy 10' with a slightly different shape, the primary difference being the incorporation of a curved middle circumferential portion 34 which is circumferentially larger than the rise 26 shown in FIG. 1.

FIG. 3 shows yet another modification which has a slightly different shape in comparison to the embodiment shown in FIG. 1. The toy 10" shown in FIG. 3 differs from the pet toy shown in FIGS. 1 and 2 primarily in that it includes a continuous flat upper surface 36, with no curved or raised portions.

FIG. 4 is a simplified plan view of the pet toy 10, 10', 10" shown in FIGS. 1, 2, or 3 which shows the circumferential arrangement of the sections 12, 14, and 16. It is also apparent by review of FIGS. 1-3 that the circumferential sections 12, 14 and 16 may be sized and spaced from one another as desired. For example, section 16 in FIG. 1 only encompasses the lip 22 while sections 16 in FIGS. 2 and 3 encompass not only the lip 22, but also project radially inward towards the center of the toy.

Although three distinct sections have been shown in each of the embodiments, it should be understood that the present invention only requires at least two different sections having distinct hardnesses. The number of sections incorporated can be increased or decreased depending upon the purpose of the toy. Therefore, it is also contemplated that more than three sections could be incorporated.

FIGS. 5, 6, and 7 are cross-sectional views of the toys 10, 10', 10" shown in FIGS. 1, 2, and 3, respectively. As shown, the boundaries 18 and 20 define the distinct separations between the different sections 12, 14 and 16.

FIG. 8 illustrates another cross-sectional configuration of the present invention wherein distinct layers are formed in the pet toy 10", as opposed to concentrically arranged sections. As shown, the pet toy 10" may include an outer layer 38, an intermediate layer 40, and an inner layer 42. The outer layer 38 would traverse not only the upper surface of the toy, but could also extend along the lower surface thereof. Similarly, layers 40 and 42 extend coterminously with layer 38 so as to present a cross-section along the toy 10" which is in a layered configuration. For the layered configuration shown in FIG. 8, the most efficient way in which to mold a pet toy in this manner is to provide die cut sheets of material stacked upon one another within the mold. An interface 44 can be defined as the separation line between the various sheets of material which are used to mold the pet toy. This interface 44 would become bonded during the molding process thereby sealing the layers to prevent separation of layers during use. In FIG. 8, the interface 44 has been designated with a dotted line for clarity. As with the first configuration which utilizes sections of varying hardness, the layered configuration in FIG. 8 would incorporate a material having the lowest hardness in layer 38, a material of a next higher hardness for layer 40, and a material of highest hardness for layer 42.

FIGS. 9, 10, and 11 illustrate additional shapes in which the pet toy may be molded. For FIG. 9, the pet toy 50 resembles a boomerang 50 defined by a pair of legs 52 which extend away from one another at an angle, and an apex 54 delineates the intersection between the legs 52.

FIG. 10 illustrates a pet toy 56 in a three-legged or three featured configuration defined by legs 58 which are substantially equally spaced from one another, and which extend from a central area 60.

FIG. 11 illustrates a pet toy 62 defined by four substantially equally spaced legs 64, and which extend from a central area 66.

For the pet toys 50, 56 and 64 shown in FIGS. 9–11, also illustrated in the cross section of FIG. 12 are the various sections which define the materials of different hardnesses. A central section 72 is surrounded by an intermediate section 74 which in turn, is surrounded by an outer section 76. Boundary 68 defines the separation between outer section 76 and intermediate section 74. Boundary 70 defines the separation between central section 72 and intermediate section 74.

FIG. 13 illustrates the pet toys 50, 56, and 64 in cross-section; however, arranged in the layered configuration. The layers in FIG. 13 are illustrated as outer layer 78, intermediate layer 80, and inner layer 82.

FIG. 14 illustrates a simplified cross-sectional view of a clam shell type mold which may be used to facilitate molding of the present invention. The mold 84 includes an upper half 86, a lower half 88, and a hinge 90 which facilitates opening and closing of the mold. A cavity 92 defines the shape of the pet toy to be molded therein. In the case of FIG. 14, the cavity 92 is shown as having a shape to facilitate molding of the pet toy of FIGS. 3 and 7. Sprues (not shown) can be located along the mold so that the material can be injected into the cavity 92 of the mold to form the various sections 12, 14 and 16. These sections are shown in FIG. 12 in order to visualize the arrangement of a pet toy to be molded within mold 84. Boundary lines 18 and 20 are also shown to facilitate visualization of where material is to be injected into the mold. In order to create the outer section 16, it may be necessary to provide a number of sprues along the periphery of the mold so that flow of material through the sprues results in formation of a continuous and uniform outer ring. Similarly, for the intermediate section 14, a number of sprues may be required to produce the intermediate section in a continuous and uniform manner. For the center section 12, it may only be necessary to provide one sprue which results in the formation of a circular shaped structure. In the event that a layered configuration is desired, various die cut sections of material would be placed upon one another in the mold, and then the molding process would take place thereby joining the sections to one another along the edges of each of the die cut sections. As mentioned above, transfer and compression molding techniques can be utilized when the pet toy is made from rubber materials.

Materials which are contemplated for use with the present invention include, but are not limited to, synthetic rubber, natural rubber, and combinations thereof, as well as plastics. For rubber, there are many different ways in which the hardness of the rubber can be modified. For example, silica based rubbers can be modified wherein changing the silica content thereby accommodates the desired hardness. For clay based rubbers, the amount of clay can also be modified to thereby effect the hardness of the rubber. For plastics, there is a wide array of them which have different hardnesses; therefore, to vary the hardness of the pet toy among the different sections or layers, one would simply choose the desired plastic with the appropriate hardness.

Now referring to FIG. 15, yet another embodiment of the present invention is shown which utilizes a combination of materials such as rubber and canvass or fabric. The pet toy 100 includes an outer section 102 preferably made of rubber or plastic, and a center section 106 preferably made of canvass/fabric. FIG. 15 resembles in shape the pet toy shown in FIG. 1 which also includes an outer concentric lip 104. Boundary 108 defines the interface between the center section 106 and the outer section 102. In the manufacturing of this embodiment, the canvass or cloth would be placed within the mold like a die cut section in one of the previous embodiments. The rubber or plastic would then be added to the mold as by injection molding, transfer and/or compression molding processes. The inner most concentric portion of outer section 102 would overlap with the outer most concentric portion of the canvass/cloth material thereby forming a tight bond due to the heat and compression during the molding process. The material, of course, would be one which could withstand the temperature and stress of the molding process thereby forming a good bond/connection between the canvass/cloth and the outer section of rubber or plastic. It is also contemplated that the center section 106 could merely be attached to the outer section 102 as by adhesive or other well known means. The outer section 102 would have a sufficient hardness so that the user could still grasp the pet toy and throw the pet toy so that the pet toy would still maintain good flight characteristics. If it was desired to use a canvass or fabric within a layered configuration, then referring back to FIG. 8, the outer layer 38 could be constructed of canvass or fabric, and could simply be attached as by adhesive to layer 40. When using canvass or fabric in the embodiment shown in FIG. 8, it may also be advantageous only to use the canvass or fabric on the upper surface of the pet toy, and not the lower surface of the pet toy. Thus, the outer layer 38 would terminate at or near the interface 44.

The various sections of the pet toy may be of different colors. In addition to increasing the aesthetic appearance of the pet toy by utilizing different colors, there also are utilitarian reasons to incorporate different colors. For example, color differentiation may assist in use of the pet toy during twilight hours wherein at least one of the sections could be of a bright color. It may also be desirable to provide some sections of the pet toy with transparent, translucent, and opaque combinations, thereby further enhancing the ability to see the pet toy during flight.

By way of example and not limitation, the hardness of the inner section or most interior layer of the pet toy could be in the range of 75–120 on the Shore Hardness A scale. For the outer layer or outer section of the pet toy, an acceptable hardness could be in the range of 40–75 on the Shore Hardness A scale. For pet toys such as the frisbee® type shapes shown in the above-mentioned figures, providing a pet toy according to these hardnesses has been found to be advantageous. However, it shall be understood that various other ranges of hardness may be incorporated depending upon the exact shape of the pet toy and the intended use of the pet toy, for example, whether the pet toy is intended to be used indoors or outdoors.

By the foregoing, there are numerous advantages which are associated with the present invention. Structural stability of the pet toy can be maintained through use of a pet toy which is molded, and various types of material may be incorporated within a single pet toy thereby enhancing use for animals and preventing damage to objects which may be struck by the pet toy. The sectioned or layered configurations also provide flexibility in construction of the pet toy wherein the pet toy may be formed either through injection molding, or through compression molding wherein die cut sections are joined during the molding process.

Although the preferred embodiments discussed above disclose the outermost layer or section being of a lower hardness, the present invention also contemplates arrangement of the layers/sections wherein the outer section/layer could be of the hardest material. One example of a beneficial use for this type of reverse arrangement of the materials might be for a pet toy which requires greater flexibility or bending, yet the pet toy is still desired to be used like a frisbee®. In this case, the outer section or layer would be of a hardness which would prevent damage to the animal's mouth, and the most inner layer or section would be of a lesser hardness which thereby better facilitates bending of the pet toy.

Referring now to FIG. 16, another pet toy of the present invention is shown in a layered configuration. As mentioned above, the pet toy may include a fabric/canvass layer, and there can be less than three distinct sections having different hardnesses. FIG. 16 more specifically illustrates a pet toy 110 having a frisbee shape with an interior cloth/canvas layer 112 which is surrounded by an upper rubber layer 114 and a lower rubber layer 116. Thus, the pet toy in FIG. 16 is simply a three layered configuration with one of the layers being cloth/canvas, and the two remaining layers being made of a rubber material. Preferably, the upper rubber layer 114 has a lower hardness than the lower rubber layer 116. By way of example and not limitation, the upper rubber layer 114 could have a hardness in the range of 30–45 on the Shore hardness A scale, while the lower rubber layer 116 could have a range of hardness between about 60 and 90 on the Shore hardness A scale. The peripheral edge 118 of the pet toy constitutes a boundary where each of the layers 112, 114, and 116 terminate. However, it is also contemplated that one or more of the layers could extend to the edge 1118, while the remaining layers terminated circumferentially inward of the outer peripheral edge 118. The thickness of the rubber layers 114 and 116 can vary, but a known acceptable range for the overall thickness of the pet toy could be between about 0.08 and 0.150 inches which allows sufficient rigidity and minimizes weight thereby enabling the toy to maintain aerodynamic characterstics for flying like a frisbee when thrown.

In the embodiment of FIG. 16, one method of manufacturing the toy includes providing a roll or sheet stock of the rubber layer 114, and then to feed this rubber layer along with the cloth/canvas layer 112 simultaneously through a pair of compression rollers so that the cloth layer is compressed against/impregnated within the rubber sheet material. Then, the other rubber layer 116 also provided in a sheet stock could be placed through a pair of compression rollers simultaneously with the joined first rubber layer 114 and cloth/canvas layer 112. Thus, a three layered preform would be created, and this preform could then be die cut into circular shaped pieces. The circular shaped pieces would then be placed within a mold such as shown at FIG. 14, and compression molding could take place to permanently bond the three layers into the final shape of the pet toy. Within the compression molding process, vulcanization takes place where the upper and lower rubber layers become chemically bonded as thermoset rubber, and this chemical cross linkage between the rubber layers forms a tight bond which is not easily separated.

The small gaps or spaces between the threads of the cloth/canvas material allows the rubber layers to contact one another and to become chemically bonded during the vulcanization. The cloth layer 112 helps to maintain a uniform boundary between the rubber layers; however, it is also contemplated within the scope of the present invention that the cloth layer 112 could be completely eliminated, and the pet toy could simply be made by using two different sheets of rubber material which are die cut, placed within a mold, and which then become bonded through vulcanization.

As well understood by those skilled in the art, thermoplastic materials that are combined within a product as well as combinations of thermoplastics and rubber cannot be vulcanized to chemically bond the plastics or to chemically bond the plastics to the rubber. Therefore, any "bonding" that takes place for thermoplastics is bonding by mechanical compression forces. One great advantage of the present invention is that the vulcanization provides an extremely strong and durable bond, and the layers of the product cannot be easily stripped or separated from one another.

This invention has been described with respect to various embodiments. However, it shall be understood that various other modifications may be made within the spirit and scope of this invention.

What is claimed is:

1. A molded pet toy comprising:
a first layer made of a material selected from the group consisting of cloth, fabric, and canvas;
a second layer of material placed over an upper surface of the first layer, the second layer being made of a material selected from the group consisting of natural rubber, synthetic rubber, and combinations of natural and synthetic rubber;
a third layer placed against a lower surface of said first layer, said third layer being made of a material selected from the group consisting of natural rubber, synthetic rubber, and combinations of natural and synthetic rubber, and wherein said third layer has a material hardness different from said second layer, and wherein said pet toy is manufactured in a compression molding process wherein said second and third layers become chemically bonded through vulcanization.

2. A pet toy, as claimed in claim 1, wherein:
said second layer has a higher hardness than said third layer.

3. A pet toy, as claimed in claim 1, wherein:
said third layer has a higher hardness than said second layer.

4. A pet toy, as claimed in claim 1, wherein:
said pet toy has a circular shape.

5. A pet toy, as claimed in claim 1, wherein:
said pet toy has a circular shape, and an annular lip formed about a periphery of said pet toy.

6. A pet toy, as claimed in claim 5, wherein:
said circular shape comprises a body of said pet toy, and said annular lip extends substantially perpendicular to said body.

7. A method of manufacturing a pet toy, said method comprising the steps of:
providing a layered configuration forming a preform, said preform comprising a first interior layer made of a material selected from the group consisting of cloth, fabric, or canvas, a second layer placed over and in contact with the first layer, said second layer being made of a rubber material, and a third layer placed under and in contact with the first layer, said third layer being made of a rubber material having a hardness that is different from the second layer;
providing a mold of a desired shape;
introducing the three layered preform into a mold cavity of the mold;
conducting a molding operation to mold the preform wherein the second and third layers become integrally bonded through vulcanization.

8. A method, as claimed in claim 7, wherein:
said molded pet toy has a circular shape.

9. A method, as claimed in claim 7, wherein:
said molded pet toy has a circular shape including an annular lip.

10. A method, as claimed in claim 7, wherein:
said second layer is made of a rubber material having a higher hardness than said third layer.

11. A method, as claimed in claim 7, wherein:
said rubber material is selected from the group consisting of natural rubber, synthetic rubber, and combinations of synthetic and natural rubber.

* * * * *